US012040582B2

(12) United States Patent
Serrano et al.

(10) Patent No.: US 12,040,582 B2
(45) Date of Patent: Jul. 16, 2024

(54) PISTON DEVICE FOR ACTUATING A TOOL

(71) Applicant: Gulfstream Aerospace Corporation, Savannah, GA (US)

(72) Inventors: Salvador Serrano, Savannah, GA (US); Esteban Hernandez, Savannah, GA (US); Teofilo Baltazar, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 335 days.

(21) Appl. No.: 16/948,757

(22) Filed: Sep. 30, 2020

(65) Prior Publication Data

US 2022/0102927 A1 Mar. 31, 2022

(51) Int. Cl.

| | |
|---|---|
| ***H01R 43/042*** | (2006.01) |
| ***B25B 27/14*** | (2006.01) |
| ***B25B 28/00*** | (2006.01) |
| ***H01R 43/048*** | (2006.01) |

(52) U.S. Cl.

CPC ....... *H01R 43/0427* (2013.01); *B25B 27/146* (2013.01); *B25B 28/00* (2013.01); *H01R 43/048* (2013.01)

(58) Field of Classification Search

CPC .............. H01R 43/0427; H01R 43/048; H01R 43/0428; B25B 27/146; B25B 28/00

See application file for complete search history.

(56) References Cited

U.S. PATENT DOCUMENTS

| | | | | |
|---|---|---|---|---|
| 1,268,139 A * | 6/1918 | Martin | ............... | H01R 43/0427 140/117 |
| 2,208,058 A * | 7/1940 | Smith | ............... | H01R 43/0427 140/113 |
| 2,396,562 A * | 3/1946 | Forss | ............... | B25B 27/146 72/409.03 |
| 2,996,939 A * | 8/1961 | Meier | ............... | B65B 13/188 81/301 |
| 3,255,525 A * | 6/1966 | Frenzel | ............... | B26B 17/02 333/81 R |

(Continued)

FOREIGN PATENT DOCUMENTS

| | | |
|---|---|---|
| CH | 619567 A5 * | 9/1980 |
| CN | 201813058 U * | 4/2011 |

(Continued)

*Primary Examiner* — Jeffrey T Carley

(74) *Attorney, Agent, or Firm* — Lorenz & Kopf, LLP

(57) ABSTRACT

Devices and methods for actuating a tool and methods for making such devices are provided. In one example, the device includes a piston subassembly. The piston subassembly includes a cylinder having a cavity, a head disposed in the cavity to move between first and second positions, and a rod coupled to the head and extending away from the second position. A holding subassembly is coupled to the piston subassembly. The holding subassembly includes a first holding member coupled to the rod and configured to hold a first leg of the tool and a second holding member spaced apart from the first holding member. The second holding member is configured to hold the second leg of the tool. When the head moves from the first position towards the second position, the rod moves the first holding member towards the second holding member.

19 Claims, 4 Drawing Sheets

(56) References Cited

U.S. PATENT DOCUMENTS

| | | | | | |
|---|---|---|---|---|---|
| 3,741,562 | A * | 6/1973 | Resch | B25B 1/18 | 81/343 |
| 3,813,915 | A * | 6/1974 | Brehm | H01R 43/0427 | 72/407 |
| 3,893,237 | A * | 7/1975 | Jahnke | A22C 17/06 | 30/228 |
| 3,919,758 | A * | 11/1975 | Stepan | H01R 43/04 | 29/753 |
| 5,058,272 | A * | 10/1991 | Steube | B25B 7/126 | 30/180 |
| 6,173,629 | B1 * | 1/2001 | Glaser | B25B 7/126 | 81/487 |
| 6,988,433 | B2 * | 1/2006 | LeClair | B23D 29/00 | 81/487 |
| 10,435,890 | B2 * | 10/2019 | Wiens | B21D 39/035 | |
| 11,072,440 | B2 * | 7/2021 | Bubolz | B64F 5/50 | |
| 2004/0089120 | A1 * | 5/2004 | LeClair | B23D 17/02 | 81/487 |
| 2004/0144229 | A1 * | 7/2004 | Savoy | B21D 22/04 | 83/669 |
| 2019/0131754 | A1 * | 5/2019 | Weaver | H01R 43/048 | |

FOREIGN PATENT DOCUMENTS

| | | | | |
|---|---|---|---|---|
| CN | 103296560 | A * | 9/2013 | |
| EP | 0299477 | A1 * | 1/1989 | |
| EP | 0648581 | A1 * | 4/1995 | B25B 27/14 |
| EP | 1270959 | A2 * | 1/2003 | B25B 27/10 |
| JP | 2013070999 | A * | 4/2013 | A61B 17/7037 |

* cited by examiner

PISTON DEVICE FOR ACTUATING A TOOL

TECHNICAL FIELD

The technical field relates generally to devices for holding and/or using a tool, and more particularly, relates to devices and methods for actuating a tool, for example, for crimping wires, connectors, terminals, or the like.

BACKGROUND

Aircraft and other vehicles include various components, subassemblies, and/or assemblies. For instance, aircraft employ wire harnesses that include a plurality of wires for providing electrical communication between the various electronic components, vehicle devices and/or the like.

It is often advantageous to utilize various apparatuses for assembling wire harnesses including tools for cutting and/or crimping electrical wiring for terminating wires, forming electrical connections, and/or preventing oxygen and moisture from reaching the metal inside the wiring that would otherwise cause corrosion. There are vast numbers of terminals available for use in crimping electrical wire systems, including insulated terminals, flag terminals, and the like. The terminals are coupled to, or otherwise attached to the end of electrical wires and crimped using a crimping tool that applies a compressive force to the terminal and/or the wire.

It is common for crimping tools to include two legs that are spaced apart from each other and a crimping head with a mouth that receives, for example, electrical wiring and/or terminals for crimping. When an electrical wire and/or a terminal is placed in the mouth of the crimp head and the legs of the tool are squeezed or otherwise brought together, the mouth of the crimp head closes to crimp the electrical wire and/or terminal. This is typically manually done by a mechanic who grips and squeezes the legs of the crimping tool with their hand to apply a compressive force to the legs, and thereby actuate the crimp head to crimp the electrical wire and/or terminal disposed in the mouth of the crimp head. However, manual crimping can be taxing on the mechanic's hand, especially in applications that require the mechanic to repeatedly manually crimp electrical wires and/or terminals at high output rates.

To reduce strain on the mechanic's hand, some crimping tools include a foot portion on one of the legs of the crimping tool that allows the mechanic to press the foot portion against a flat surface, providing better leverage in the crimping process. This requires less force from the mechanic's hand when crimping the wires. However, some wires are too short to allow crimping tools to be utilized in this way. Further, it still puts some strain on the hand and wrist of the mechanic. Electrical crimping devices put less strain on the mechanic's hand but are not useable in many applications due to safety protocols and/or regulations.

Accordingly, it is desirable to provide devices for actuating a tool, methods for making such tools, and methods for actuating a tool that address one or more of the foregoing issues. Furthermore, other desirable features and characteristics of the various embodiments described herein will become apparent from the subsequent detailed description and the appended claims, taken in conjunction with the accompanying drawings and this background.

SUMMARY

Various non-limiting embodiments of a device for actuating a tool having a first leg and a second leg, a method for actuating such a tool, and a method for making a device for actuating such a tool are provided herein.

In a first non-limiting embodiment, the device includes, but is not limited to, a piston subassembly. The piston subassembly includes a cylinder having a cavity disposed therein, a head movably disposed in the cavity to move between a first position and a second position, and a rod coupled to the head and extending in a direction away from the second position. The device further includes, but is not limited to, a holding subassembly coupled to the piston subassembly. The holding subassembly includes a first holding member coupled to the rod and configured to hold the first leg of the tool and a second holding member spaced apart from the first holding member and configured to hold the second leg of the tool. When the head moves from the first position towards the second position, the rod moves the first holding member towards the second holding member.

In another non-limiting embodiment, the method for actuating the tool includes, but is not limited to, disposing the first leg and the second leg of the tool in a first holding member and a second holding member, respectively, of a device. The first holding member and the second holding member are spaced apart from each other. The first holding member is coupled to a piston rod. The method further includes, but is not limited to, applying a force to a piston head that is coupled to the piston rod to move the piston head from a first position to a second position, thereby moving the piston rod and the first holding member to move the first leg towards the second leg.

In another non-limiting embodiment, the method for making the device includes, but is not limited to, coupling a piston rod to a piston head. The method further includes, but is not limited to, movably disposing the piston head in a piston cavity of a piston cylinder. The piston head is configured to move in the piston cavity between a first position and a second position and the piston rod extends from the piston head in a direction away from the second position. The method further includes, but is not limited to, coupling a first holding member to the piston rod. The first holding member is configured to hold the first leg. The method further includes, but is not limited to, spacing a second holding member and the first holding member apart from each other. The second holding member is configured to hold the second leg. When the piston head moves from the first position towards the second position, the piston rod moves the first holding member towards the second holding member.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to devices for actuating a tool having a pair of legs. The exemplary embodiments taught herein provide a device that includes a piston subassembly and a holding subassembly coupled to the piston subassembly. The piston subassembly includes a cylinder having a cavity disposed therein. A head is movably disposed in the cavity to move between a first position and a second position. The head is coupled to a rod that extends in a direction away from the second position.

The holding subassembly includes a first holding member and a second holding member. The first holding member is coupled to the rod and is configured to hold one of the legs of the tool. The second holding member is spaced apart from the first holding member and is configured to hold the other leg of the tool. As such, the tool is securely held by the device by placing the legs of the tool in the respective holding members of the device. In an exemplary embodiment, the second holding member is free or otherwise decoupled from the rod and the head but is coupled to the device to positionally fix the second holding member relative to the cylinder. Accordingly, when the head moves from the first position towards the second position, the rod moves the first holding member towards the positionally fixed second holding member to squeeze the legs of the tool together, thereby actuating the tool.

In an exemplary embodiment, an actuator subassembly is operatively coupled to the piston subassembly to move the head between the first and second positions. For example, the actuator subassembly includes an actuator, such as a push button or the like, that is configured to move between an engaged position and a disengaged position for selectively applying a force to the head to move the head between the first and second positions. In an exemplary embodiment, advantageously, by disposing the legs of the tool in the holding members of the device and moving the actuator to the engaged position, the tool is actuated without requiring manual application of compressive force to the legs of the tool by the mechanic. Rather, the actuator subassembly is easily moved to the engaged position by, for example, pushing the actuator button. Consequently, the actuator subassembly directs the force required to the head to cooperatively move the head, rod, and first holding member to thereby move the first leg of the tool towards the second leg to actuate the tool.

Figure 1:
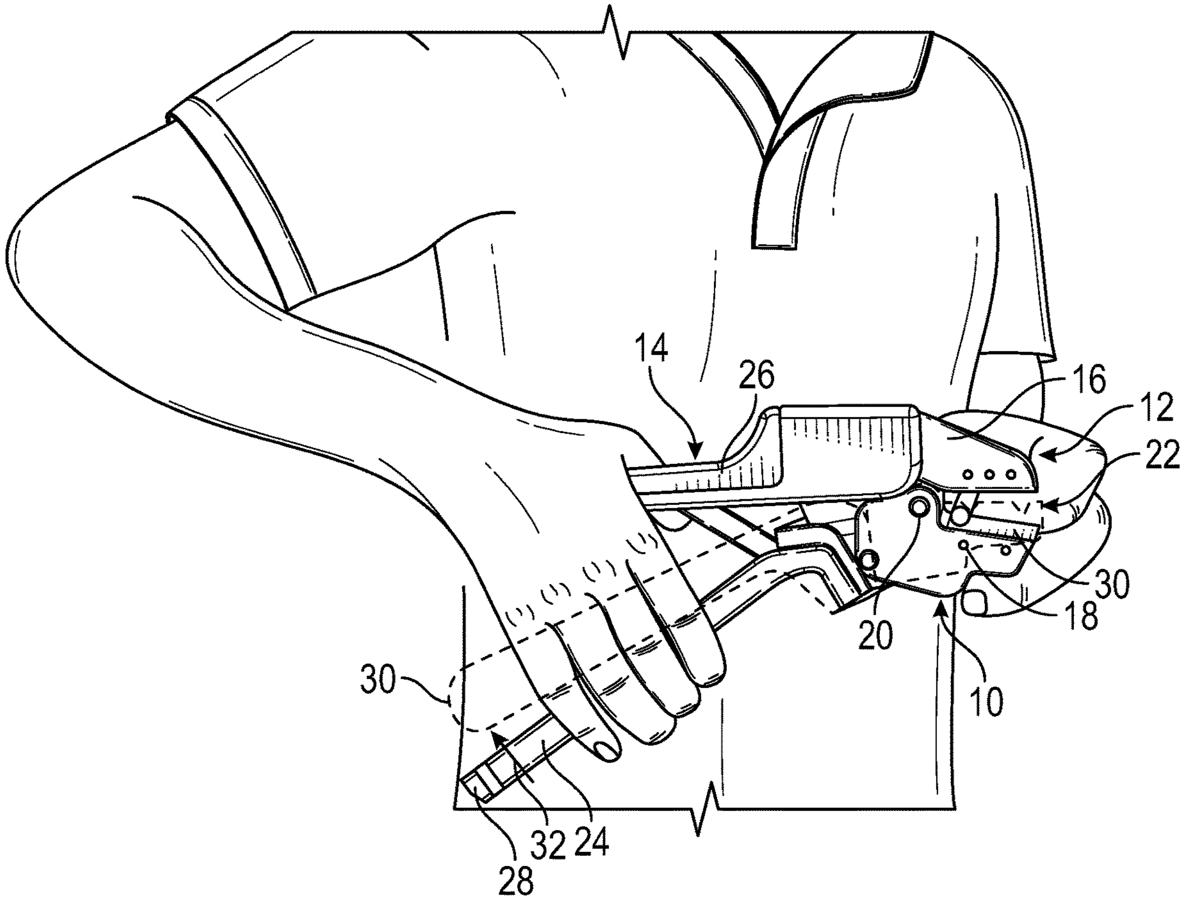
FIG. 1 illustrates a perspective view of a tool in accordance with an exemplary embodiment.

FIG. 1 illustrates a perspective view of a tool 10 in accordance with an exemplary embodiment. In an exemplary embodiment, the tool 10 is a crimping tool. The tool 10 includes a head section 12 that extends to a tail section 14. The head section 12 includes a top jaw 16 and a bottom jaw 18 that is pivotally coupled to the top jaw 16 at a pivot point 20 to allow the top jaw 16 and the bottom jaw 18 to move relative to each other to define a mouth 22. As will be discussed in further detail below, the bottom jaw 18 pivots relative to the top jaw 16 about the pivot point 20 to open the mouth 22 to receive an object(s) such as, for example, a wire(s), a connector(s), a terminal(s), or the like, and to at least partially close the mouth 22, for example, to crimp the object(s) or otherwise to apply a force to the object(s) by the top and bottom jaws 16 and 18.

As illustrated, the tail section 14 includes a leg 24 that is coupled to the bottom jaw 18 and a leg 26 that is spaced apart from the leg 24 and coupled to the top jaw 16. In an exemplary embodiment, the leg 26 is positionally fixed relative to the top jaw 16 and the leg 24 is movable between a first position 28 and a second position 30. When the leg 24 is in the first position 28, the mouth 22 is open, for example, to receive the object, for example a crimp-able material, component, or the like. When the leg 24 is moved towards the second position 30 (e.g., via squeezing the legs 24 and 26 together), the bottom jaw 18 pivots about the pivot point 20 towards the top jaw 16 to at least partially close the mouth 22, thereby actuating the tool 10. For example, actuating the tool 10 includes moving and/or pivoting at least one of the leg 24 and the leg 26 towards each other to move and/or pivot at least one of the top jaw 16 and the lower jaw 18 towards each other.

In an exemplary embodiment, the leg 24 is biased towards the first position 28 and is movable from the first position 28 towards the second position 30 by application of a compressive force 32. For example, a mechanic may grip the leg 24 and the leg 28 with a hand and squeeze the hand to apply a compressive force 32 to the leg 26. When the compressive force 32 overcomes the bias, the leg 24 is moved from the first position 28 towards the second position 30.

Figure 2:
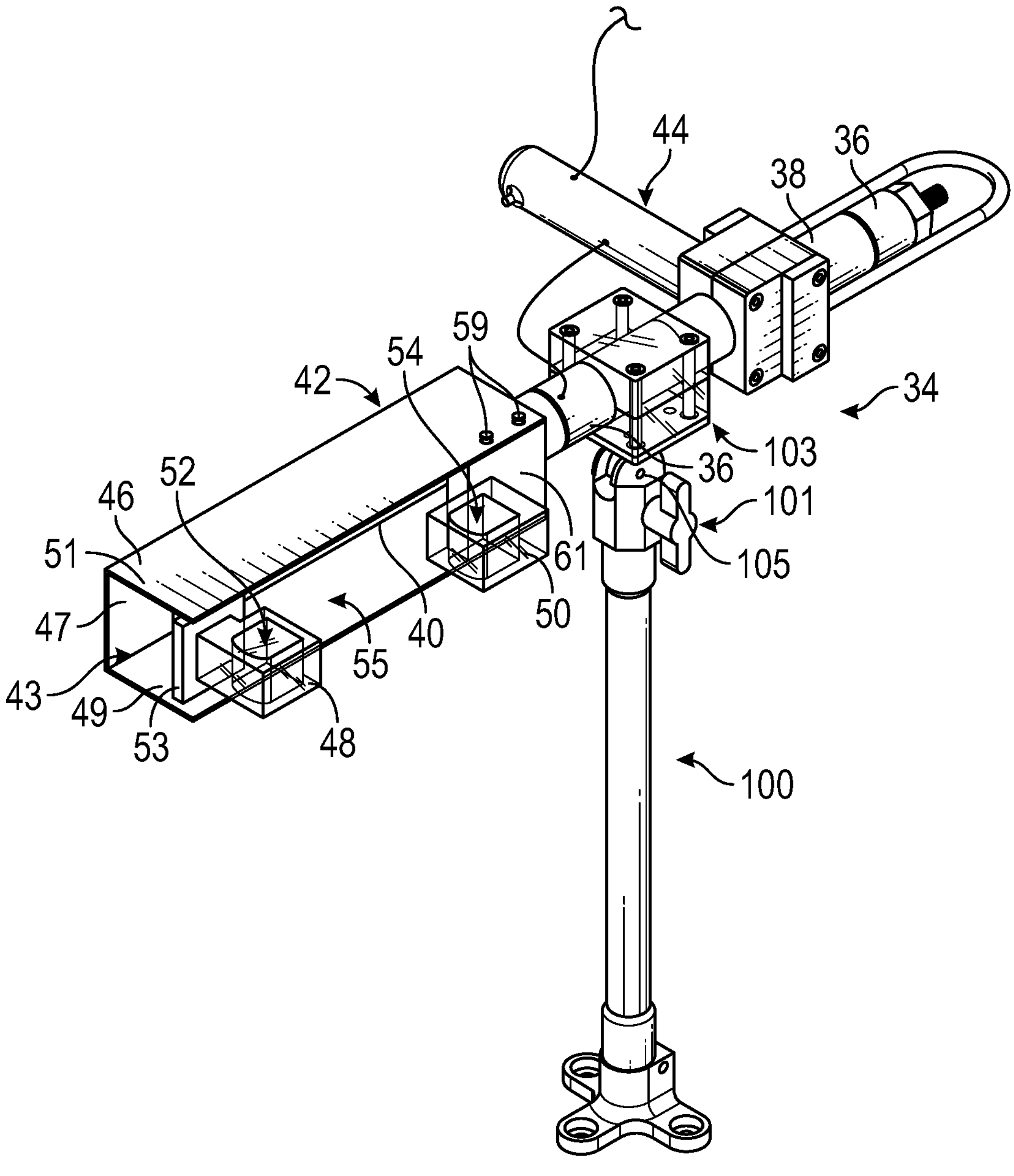
FIG. 2 illustrates a perspective view of a device for actuating a tool in accordance with an exemplary embodiment.

FIG. 2 illustrates a perspective view of a device 34 for actuating the tool 10 in accordance with an exemplary embodiment. The device 34 includes a piston subassembly 36 that includes a cylinder 38 (also referred to herein as "piston cylinder") and a rod 40 (also referred to herein as "piston rod") that is movable relative to the cylinder 38, a holding subassembly 42 that is coupled to the piston subassembly 36, and an actuator subassembly 44 that is operatively coupled to the piston subassembly 36.

The holding subassembly 36 includes a guard 46, a holding member 48, and a holding member 50 that is spaced apart from the holding member 48. As illustrated, the guard 46 at least partially surrounds at least a portion of the piston rod 40. In the illustrated example, the guard 46 has a substantially "C-shaped" cross-section that is projected along a length of the guard 46 to form an open channel 43 and includes an intermediate wall 47 (e.g., substantially vertical wall) that is disposed between and coupled to walls 49 and 51 (e.g., substantially horizontal walls), which are disposed transverse to the wall 47. The walls 49 and 51 are substantially parallel and spaced apart to form an opening 55 of the open channel 43. In an exemplary embodiment, the guard 46 is coupled to the piston subassembly 36, for example a non-moveable or fixed portion of the piston subassembly 36.

The holding member 48 is coupled to the piston rod 40 via a block 53. In particular, the piston rod 40 is disposed in the open channel 43 and the end portion of the piston rod 40 is attached to the block 53, which is disposed between the walls 49 and 51 adjacent to the opening 55 of the open channel 43. As will be discussed in further detail below, the block 53, which carries the holding member 48, can move along and/or between the inner surfaces of the walls 49 and 51 for stable, linear-stroking movement of the holding member 48. The holding member 48 is disposed through the opening 55 and protrudes outside the guard 46 so that the holding member 48 is readily accessible from outside of the guard 46. In an exemplary embodiment, the holding member 48 is configured to hold the leg 24 of the tool 10. As illustrated, the holding member 48 has a first cavity 52 formed therein that is sized or otherwise configured to securely hold the leg 24 of the tool 10.

The holding member 50 is coupled to the device 10 so as to be positionally fixed relative to the piston cylinder 38. In the illustrated example, the holding member 50 is coupled to the guard 46 via block 61. The block 61 is disposed between and attached to the walls 49 and 51 via fasteners 59 adjacent to the opening 55 of the open channel 43. The block 61 carries the holding member 50, which is disposed through the opening 55 and protrudes outside the guard 46 so that the holding member 50 is readily accessible from outside of the guard 46. In an exemplary embodiment, the holding member 50 is configured to securely hold the second leg 26 of the tool 10. As illustrated, the holding member has a second cavity 54 formed therein that is sized or otherwise configured to securely hold the leg 26 of the tool 10. In an exemplary embodiment, the cavity 52 and the cavity 54 are axially aligned and substantially parallel to the piston rod 40, which advantageously facilitates smooth, linear-stroking of the holding member 48 towards the holding member 50 via the piston rod 40, as will be discussed in further detail below.

Figure 3:
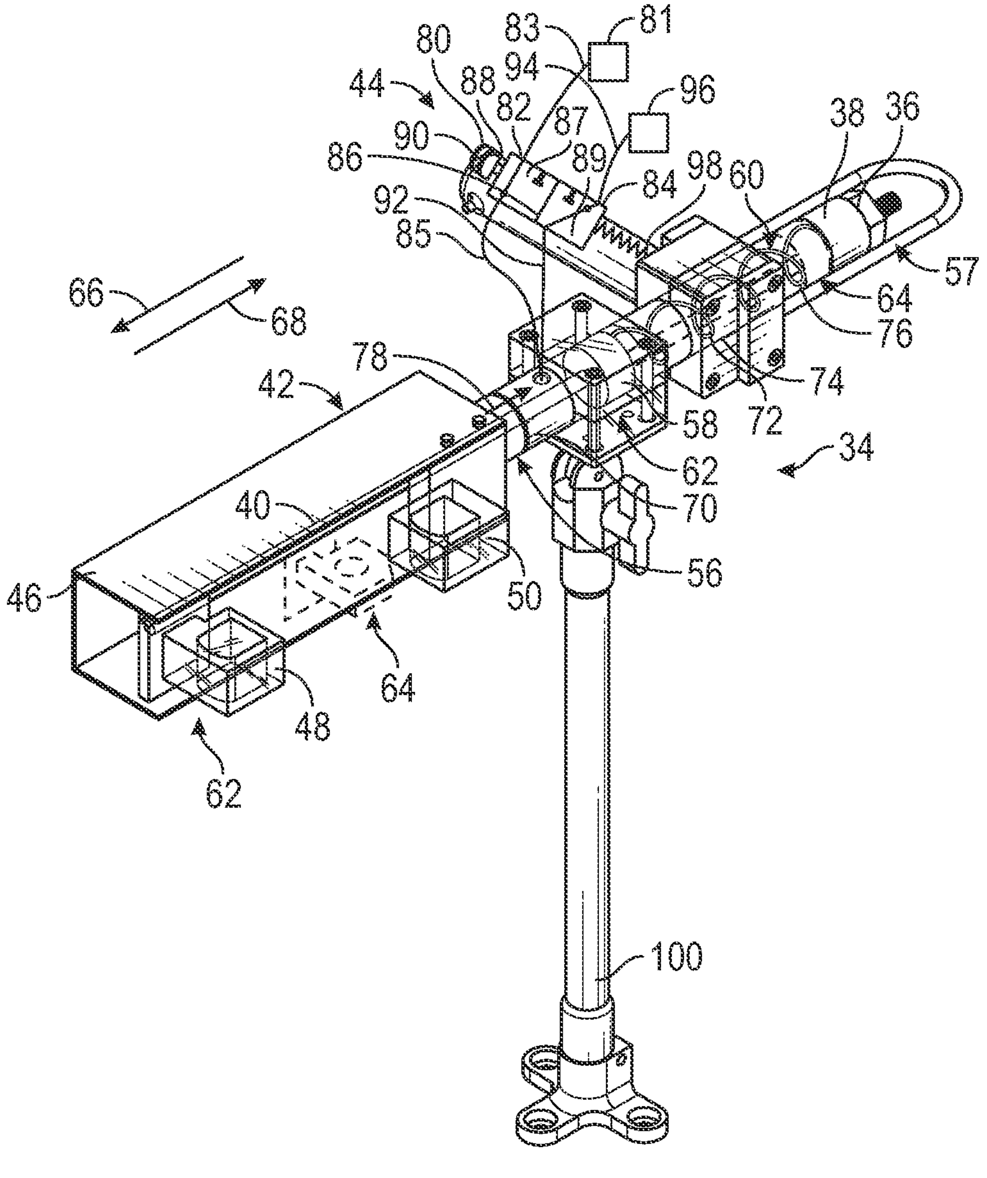
FIG. 3 illustrates a partially transparent, perspective view of a device including a piston subassembly, a holding subassembly, and an actuator subassembly in accordance with an exemplary embodiment.

Referring also to FIG. 3, the piston cylinder 38 extends from a proximal end portion 56 to a distal end portion 57 and has a cavity 60 (also referred to herein as a "piston cavity") disposed therein. A head 58 (also referred to herein as a "piston head") is movably disposed in the piston cavity 56 between a first position 62 and a second position 64 and is coupled to the piston rod 40. The piston rod 40 extends in a direction 66 away from the second position 64. For example, the piston rod 40 extends proximally from the piston head 58. Additionally, the holding member 50 is disposed distally from the holding member 48. The piston rod 40 is coupled to the piston head 58 such that the piston rod 40 and the holding member 48 move cooperatively with the piston head 58 between the first position 62 and the second position 64. In an exemplary embodiment, the direction 68 of movement of the piston head 58 from the first position 62 to the second position 64, which is opposite the direction 66, corresponds to movement of the holding member 48 towards the holding member 50. Accordingly, when the piston head 58 moves from the first position 62 towards the second position 64, the piston rod 40 moves the holding member 48 towards the holding member 50.

The piston cavity 60 includes a first cavity portion 70 that is disposed between the proximal end portion 56 and the piston head 58 and a second cavity portion 72 that is disposed between the piston head 58 and the distal end portion 57. In an exemplary embodiment, the piston head 58 is substantially flush with the internal cylindrical wall 74 of the piston cylinder 38 that defines the piston cavity 60. As such, the first cavity portion 70 and the second cavity portion 72 are isolated from each other by the piston head 58.

The second cavity section 72 includes a biasing element 76 that biases the piston head 58 towards the first position 62. In an exemplary embodiment, the biasing element 76 is a spring, or the like. When a force 78 is applied to the piston head 58 that overcomes the bias (e.g., spring force) of the biasing element 76, the piston head 58 moves towards the second position 64. Likewise, the piston rod 40 moves correspondingly, thereby moving the holding member 48 towards the holding member 50 (e.g., linear-stroke of the holding member 48 towards the holding member 50).

The actuator subassembly 44 is operatively coupled to the piston subassembly 36 to selectively direct the force 78 to the piston head 58 to move the piston head 58 from the first position 62 to the second position 64. As illustrated, the actuator subassembly 44 includes an actuator 80 and first and second chambers 82 and 84 that are operatively coupled to the actuator 80 for selectively directing the force 78 to the piston head 58. The first and second chambers 82 and 84 are separated by a wall 86 and have first and second chamber cavities 87 and 89, respectively, disposed therein. The actuator subassembly 44 is configured to receive compressed air from a compressed air source 81 via line 83 and is coupled to the first cavity 70 via line 86 to selectively direct the compressed air to the first cavity portion 70, thereby selectively applying the force 78 to the piston head 58.

The actuator 80 is configured to move between an engaged position 88 and a disengaged position 90. When the actuator 80 is in the engaged position 88, the force 78 is applied to the piston head 58. As illustrated, when the actuator 80 is in the engaged position 88, the first chamber 82 is in fluid communication with the compressed air source 81 via line 83 and with the first cavity portion 52 via line 85 to advance compressed air from the compressed air source 81 through the first chamber 82 to the first cavity portion 70. Advancing the compressed air to the first cavity portion 70 applies the force 78 to the piston head 58. For example, the compressed air pressurizes the first cavity portion 70, thereby applying the force 78 to the piston head 58 to move the piston head 58 from the first position 62 to the second position 64. In an exemplary embodiment, the force 78 is a pneumatic force.

When the actuator 80 is in the disengaged position 90, the actuator subassembly 44 obstructs or otherwise prevents applying the force 78 to the piston head 58. In particular and as illustrated, when the actuator 80 is in the disengaged position 90, fluid communication between the first chamber 82 and the first cavity portion 70 via line 85 is obstructed to prevent advancing the compressed air to the first cavity portion 70 to prevent applying the force 78 to the piston head 58. Rather, when the actuator 80 is in the disengaged position 90, the second chamber 84 is in fluid communication with the first cavity portion 70 via line 92 and with the ambient air via line 94 to release the compressed air from the first cavity portion 52 and equalize pressure between the first cavity portion 52 and the ambient air. As such, the piston head 58 is moved from the second position 64 towards the first positions 62 via the spring force from the biasing element 76. Likewise, the piston rod 40 moves the holding member 48 away from the holding member 50. In an exemplary embodiment, the device 34 further includes a silencer 96 (e.g., device for damping sound) that is coupled to the second chamber 84 and is configured to prevent and/or reduce sound associated with equalizing the pressure between the first cavity portion 70 and the ambient air.

The actuator subassembly 44 further includes a biasing element 98 that biases the actuator 40 towards the disengaged position 90. In an exemplary embodiment, the biasing element 98 is a spring or the like. When the actuator 40 is moved to the engaged position 88, the bias (e.g., spring force) of the biasing element 98 is overcome so as to allow fluid communication between the ambient air, the second chamber 84, and the first cavity portion 70. Likewise, when the actuator is in the engaged position 88, fluid communication between the second chamber 84 and the first cavity portion 70 is obstructed to prevent fluid communication between the second chamber 84 and the first cavity portion 70 via line 92.

Referring back to FIG. 2, in an exemplary embodiment, the device 34 may include a stand 100 that is coupled to at least one of the piston subassembly 36, the holding subassembly 42, and the actuator subassembly 44. As illustrated, the stand 100 is coupled to the piston subassembly 36 and extends substantially upright from the floor to position the piston subassembly 36, the holding subassembly 42, and the actuator subassembly 44 above the floor. Further, the stand 100 may include an adjustment member 101 that allows the upper portion 103 of the stand 100 that is coupled to the piston subassembly 36 to pivot about a pivot point 105 for adjusting the position of the device 10.

Figure 4:
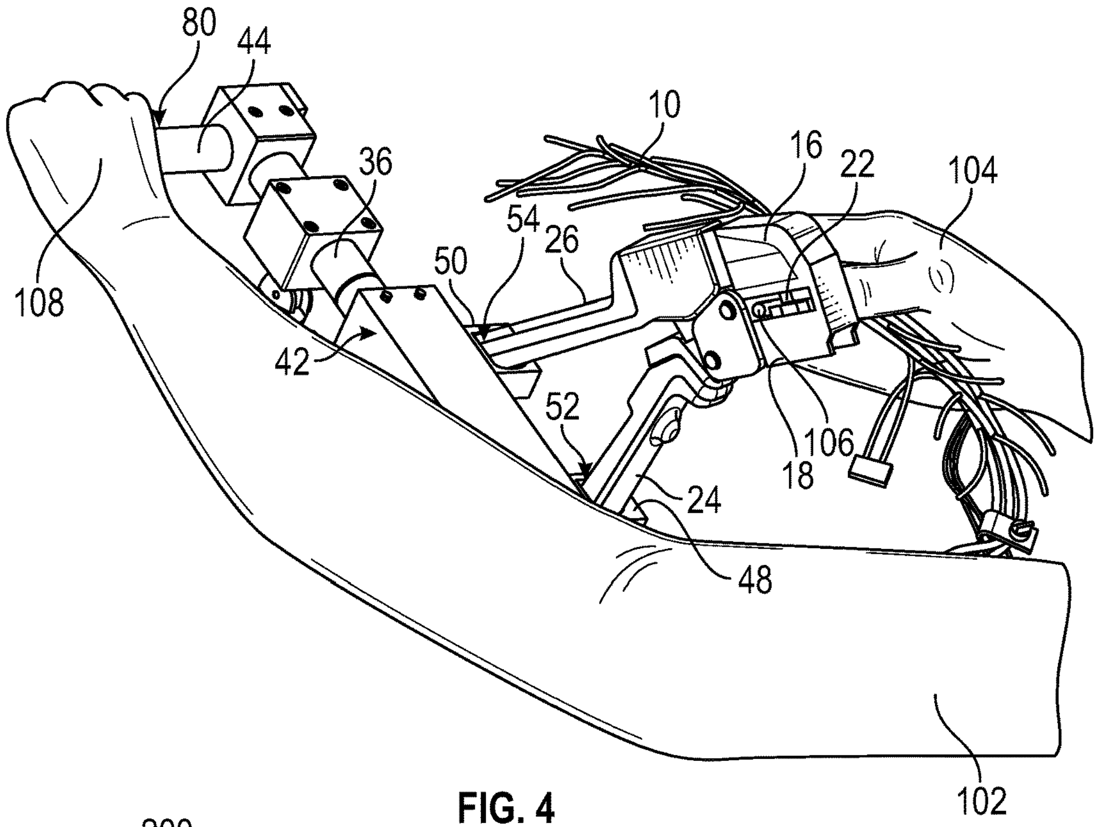
FIG. 4 illustrates a perspective view of a device actuating a tool in accordance with an exemplary embodiment.

Referring to FIG. 4, operating the device 34 to actuate the tool 10 is shown in accordance with an exemplary embodiment. As illustrated, the leg 24 and the leg 26 of the tool 10 are disposed in the cavity 52 of the holding member 48 and the cavity 54 of the holding member 50, respectively. The leg 24 of the tool 10 is in the first position 28 and a mechanic 102 uses their hand 104 to hold an electrical wire 106 in the mouth 22 of the tool. The mechanic uses their other hand 108 to actuate the actuator 80 by pressing on the actuator 80. When the actuator 80 is pressed, the actuator 80 moves from the disengaged position 90 to the engaged position 88 to actuate the tool 10 and crimp the electrical wire 106 between the top and bottom jaws 16 and 18 of the tool 10.

Figure 5:
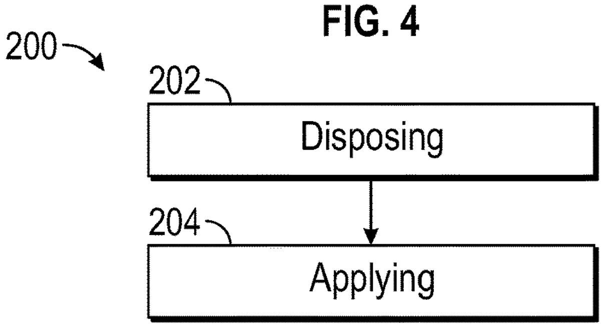
FIG. 5 illustrates a block diagram of a method for actuating a tool in accordance with an exemplary embodiment.

Referring to FIG. 5, a method 200 for actuating a tool having a first leg and a second leg in accordance with an exemplary embodiment is provided. The method 200 includes disposing (STEP 202) the first leg and the second leg of the tool in a first holding member and a second holding member, respectively, of a device. The first holding member and the second holding member are spaced apart from each other. The first holding member is coupled to a piston rod.

A force is applied (STEP 204) to a piston head that is coupled to the piston rod to move the piston head from a first position to a second position, thereby moving the piston rod and the first holding member to move the first leg towards the second leg.

In an exemplary embodiment, the piston head is disposed in a piston cavity of a piston cylinder that extends from a proximal end portion to a distal end portion. In an exemplary embodiment, the piston cavity includes a first cavity portion disposed between the proximal end portion and the piston head and a second cavity portion disposed between the piston head and the distal end portion. In an exemplary embodiment, applying (STEP 204) the force includes pressurizing the first cavity portion to apply the force as a pneumatic force to move the piston head.

In an exemplary embodiment the device further includes a biasing element that is configured to bias the piston head towards the first position. In an exemplary embodiment, the first cavity portion is depressurized to move the piston head by the biasing element towards the first position.

In an exemplary embodiment, applying (STEP 204) the force includes moving the first leg towards the second leg to crimp at least one of wires, connectors, and terminals with the tool.

Figure 6:
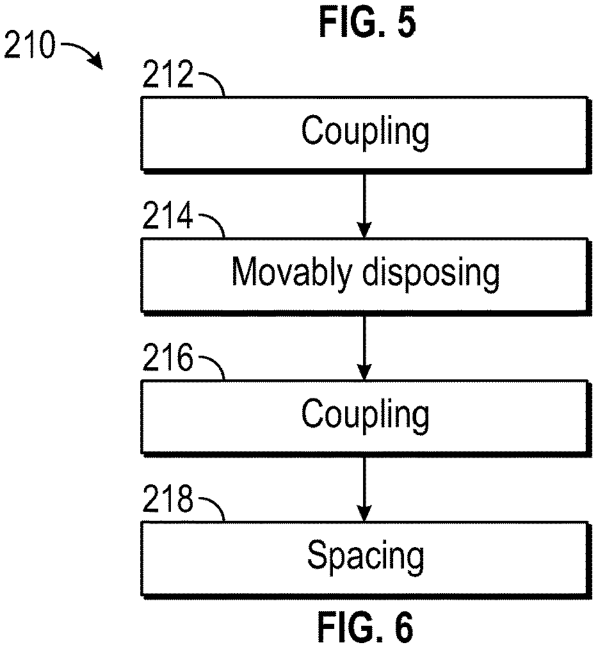
FIG. 6 illustrates a block diagram of a method for making a device for actuating a tool in accordance with an exemplary embodiment.

Referring to FIG. 6, a method 210 for making a device for actuating a tool having a first leg and a second leg in accordance with an exemplary embodiment is provided. A piston rod is coupled (STEP 212) to a piston head.

The piston head is movably disposed (STEP 214) in a piston cavity of a piston cylinder. The piston head is configured to move in the piston cavity between a first position and a second position. The piston rod extends from the piston head in a direction away from the second position.

A first holding member is coupled (STEP 216) to the piston rod. The first holding member is configured to hold the first leg.

A second holding member and the first holding member are spaced (STEP 218) apart from each other. The second holding member is configured to hold the second leg. When the piston head moves from the first position towards the second position, the piston rod moved the first holding member towards the second holding member.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A device comprising:

a tool having a first leg extending to a first jaw and a second leg extending to a second jaw, wherein the first leg and second leg are configured for manual gripping by a user to apply a compressive force thereto to close the first jaw and second jaw, and an automatic tool compressor comprising:

a piston subassembly comprising:

a cylinder having a cavity disposed therein;

a head movably disposed in the cavity to move in a first direction from a first position to a second position and in a second direction from the second position to the first position; and a rod coupled to the head and extending in the second direction away from the head;

a holding subassembly coupled to the piston subassembly, the holding subassembly comprising:

a first holding member coupled to the rod, wherein the first holding member is box-shaped to receive, abut, and hold a distal end of the first leg of the tool, and a second holding member spaced apart from the first holding member, wherein the second holding member is box-shaped to receive, abut, and hold a distal end of the second leg of the tool, wherein when the head moves from the first position towards the second position, the rod moves the first holding member along a linear path towards the second holding member while the second holding member remains stationary to close the first jaw and the second jaw.

2. The device of claim 1, wherein the second leg and second jaw remain stationary during movement of the first holding member to close the first jaw and the second jaw.

3. The device of claim 1, wherein:

the first holding member is coupled to the rod at an attachment location;

the attachment location is configured to move between an extended position and a retracted position;

the holding subassembly further comprises a guard that is disposed about the rod;

the guard surrounds an internal volume;

the extended position is located within the internal volume; and the retracted position is located within the internal volume.

4. The device of claim 1, wherein the device further includes an actuator subassembly that is operatively coupled to the piston subassembly to selectively direct a force to the head to move the head from the first position to the second position, wherein the cylinder has a proximal end portion and a distal end portion, wherein the rod extends proximally from the head, wherein the cavity includes a first cavity portion that is disposed between the proximal end portion and the head and a second cavity portion that is disposed between the head and the distal end portion, and wherein the actuator subassembly is operatively coupled to the piston subassembly to selectively direct the force through the first cavity portion to the head to move the head from the first position to the second position.

5. The device of claim 4, wherein the actuator subassembly includes an actuator that is configured to move between an engaged position and a disengaged position, and wherein when the actuator is in the engaged position, the force is applied to the head, and wherein when the actuator is in the disengaged position, the actuator subassembly prevents applying the force to the head.

6. The device of claim 5, wherein the actuator subassembly is configured to receive compressed air from a compressed air source, and wherein when the actuator is in the engaged position, the compressed air is advanced to the first cavity portion to pressurize the first cavity portion to apply the force to the head, and wherein when the actuator is in the disengaged position, the compressed air is prevented from advancing to the first cavity portion to prevent applying the force to the head.

7. The device of claim 6, wherein the actuator subassembly further includes a first chamber and a second chamber that are operatively coupled to the actuator for selective fluid communication with the first cavity portion, and wherein when the actuator is in the engaged position, the first chamber is in fluid communication with the first cavity portion to advance the compressed air from the compressed air source through the first chamber to the first cavity portion to apply the force to the head, and wherein when the actuator is in the disengaged position, fluid communication between the first chamber and the first cavity portion is obstructed to prevent advancing the compressed air to the first cavity portion to prevent applying the force to the head.

8. The device of claim 7, wherein when the actuator is in the disengaged position, the second chamber is in fluid communication with the first cavity portion and ambient air to release the compressed air from the first cavity portion and equalize pressure between the first cavity portion and the ambient air.

9. The device of claim 1, wherein the holding subassembly further comprises a guard that is disposed about the rod, wherein the guard surrounds an internal volume, and wherein the rod is located entirely within the internal volume when moving the first holding member along the linear path.

10. The device of claim 8, wherein the actuator subassembly further includes a biasing element that biases the actuator towards the disengaged position.

11. The device of claim 4, wherein the holding subassembly further includes a guard that is disposed about the rod.

12. The device of claim 11, wherein the second holding member is coupled to the guard.

13. The device of claim 12, wherein the first holding member has a first cavity formed therein configured to hold the first leg of the tool, and the second holding member has a second cavity formed therein configured to hold the second leg of the tool.

14. The device of claim 13, wherein the second holding member is positionally fixed relative to the cylinder.

15. The device of claim 1, wherein the piston subassembly further includes a biasing element that biases the head towards the first position.

16. A device for actuating a tool having a first leg and a second leg, the device comprising:

- a piston subassembly comprising:
  - a cylinder having a cavity disposed therein;
  - a head movably disposed in the cavity to move in a first direction from a first position to a second position and in a second direction from the second position to the first position; and
  - a rod coupled to the head and extending in the second direction away from the head;
- a holding subassembly coupled to the piston subassembly, the holding subassembly comprising:
  - a first holding member coupled to the rod and configured to hold the first leg of the tool, and
  - a second holding member spaced apart from the first holding member and configured to hold the second leg of the tool, wherein the second holding member is positionally fixed relative to the cylinder, wherein when the head moves from the first position towards the second position, the rod moves the first holding member towards the second holding member while the second holding member and second leg remain stationary, wherein:

- the first holding member is coupled to the rod at an attachment location;
- the attachment location is configured to move along a path between an extended position and a retracted position;
- the holding subassembly further comprises a guard that is disposed about the rod, wherein the guard surrounds an internal volume, and wherein the path is located entirely within the internal volume.

17. A device for actuating a tool having a first leg and a second leg, the device comprising:

- a piston subassembly comprising:
  - a cylinder having a cavity disposed therein;
  - a head movably disposed in the cavity to move in a first direction from a first position to a second position and in a second direction from the second position to the first position; and
  - a rod coupled to the head and extending in the second direction away from the head;
- a holding subassembly coupled to the piston subassembly, the holding subassembly comprising:
  - a first holding member coupled to the rod and configured to hold the first leg of the tool, and
  - a second holding member spaced apart from the first holding member and configured to hold the second leg of the tool, wherein the second holding member is positionally fixed relative to the cylinder,
- wherein when the head moves from the first position towards the second position, the rod moves the first holding member towards the second holding member while the second holding member and second leg remain stationary, wherein:
- the piston head is configured to move along a linear path within the cavity, wherein the piston head divides the cavity into a proximal cavity portion and a distal cavity portion;
- the device further comprises a fluid line in communication with the proximal cavity portion for selectively introducing compressed fluid to the proximal cavity portion;

wherein the device has a first configuration in which the proximal cavity portion has a minimum volume and the piston head and the first holding member are at respective extended positions; and wherein the device has a second configuration in which the proximal cavity portion has a maximum volume and the piston head and the first holding member are at respective retracted positions.

18. The device of claim 1, further comprising a stand having a bottom end configured for resting on a surface and having a top end attached to the holding subassembly at a pivot point.

19. The device of claim 1, wherein the second holding member is fixed to the cylinder to prevent any relative movement between the second holding member and the cylinder.

* * * * *